US012234423B2

(12) United States Patent
Mushrush et al.

(10) Patent No.: US 12,234,423 B2
(45) Date of Patent: Feb. 25, 2025

(54) ANTIFRICTION COATING COMPOSITION

(71) Applicants: DDP SPECIALTY ELECTRONIC MATERIALS US 9, LLC, Wilmington, DE (US); DUPONT POLYMERS, INC., Wilmington, DE (US)

(72) Inventors: Melissa Mushrush, Midland, MI (US); Peter A. Fox, Newark, DE (US); Gary Weber, Freeland, MI (US); Jennifer Vail, Wilmington, DE (US); Biswajit Choudhury, Wilmington, DE (US)

(73) Assignee: DUPONT SPECIALTY PRODUCTS USA, LLC, Wilmington, DE (US)

( * ) Notice: Subject to any disclaimer, the term of this patent is extended or adjusted under 35 U.S.C. 154(b) by 0 days.

(21) Appl. No.: 18/041,043

(22) PCT Filed: Aug. 23, 2021

(86) PCT No.: PCT/US2021/047110
§ 371 (c)(1),
(2) Date: Feb. 8, 2023

(87) PCT Pub. No.: WO2022/046617
PCT Pub. Date: Mar. 3, 2022

(65) Prior Publication Data
US 2023/0287289 A1 Sep. 14, 2023

Related U.S. Application Data

(60) Provisional application No. 63/069,446, filed on Aug. 24, 2020.

(51) Int. Cl.
*C10M 111/04* (2006.01)
*C10M 103/02* (2006.01)
(Continued)

(52) U.S. Cl.
CPC ......... *C10M 111/04* (2013.01); *C10M 103/02* (2013.01); *C10M 103/06* (2013.01);
(Continued)

(58) Field of Classification Search
CPC .................. C10M 111/04; C10M 103/02; C10M 103/06; C10M 107/38; C10M 107/44; C10M 2201/0413; C10M 2201/0663; C10M 2213/0623; C10M 2217/0443; C10M 2201/041; C10M 2201/065; C10M 2201/0653; C10M 2201/066; C10M 2205/022; C10M 2205/0225; C10M 2209/04; C10M 2209/043; C10M 2209/084; C10M 2209/0845;
(Continued)

(56) References Cited

U.S. PATENT DOCUMENTS 5,886,129 A 3/1999 DeColibus
7,368,182 B2 5/2008 Kubota
(Continued)

FOREIGN PATENT DOCUMENTS

WO 2016073341 A1 5/2016

*Primary Examiner* — Taiwo Oladapo

(57) ABSTRACT

An antifriction coating formulation composition comprising (a) a soluble resin, (b) an insoluble polymer, (c) optionally a solid lubricant, and (d) a solvent.

8 Claims, 3 Drawing Sheets

LFW-1 test geometry.

(51) Int. Cl.
*C10M 103/06* (2006.01)
*C10M 107/38* (2006.01)
*C10M 107/44* (2006.01)
*C10N 40/04* (2006.01)
*C10N 40/25* (2006.01)
*C10N 40/30* (2006.01)
*C10N 50/02* (2006.01)

(52) U.S. Cl.
CPC ........ *C10M 107/38* (2013.01); *C10M 107/44* (2013.01); *C10M 2201/0413* (2013.01); *C10M 2201/0663* (2013.01); *C10M 2213/0623* (2013.01); *C10M 2217/0443* (2013.01); *C10N 2040/04* (2013.01); *C10N 2040/25* (2013.01); *C10N 2040/30* (2013.01); *C10N 2050/02* (2013.01)

(58) Field of Classification Search
CPC .... C10M 2209/101; C10M 2209/1013; C10M 2209/102; C10M 2209/1023; C10M 2209/103; C10M 2209/1033; C10M 2213/02; C10M 2213/023; C10M 2213/062; C10M 2215/305; C10M 2217/028; C10M 2217/0285; C10M 2217/044; C10M 2217/045; C10M 2217/0453; C10M 2229/00; C10M 2229/003; C10M 169/044; C10M 171/00; C10N 2040/04; C10N 2040/25; C10N 2040/30; C10N 2050/02; C10N 2020/091; C10N 2020/093; C10N 2030/06; C10N 2050/023; C09D 179/08; C08K 3/04; C08K 3/30; C08L 79/08

See application file for complete search history.

(56) References Cited

U.S. PATENT DOCUMENTS

| | | |
|---|---|---|
| 2005/0269787 A1 | 12/2005 | Muramatsu et al. |
| 2007/0230846 A1 | 4/2007 | Tanaka et al. |
| 2012/0270968 A1* | 10/2012 | Mao .................. C09D 5/08 523/400 |
| 2015/0337824 A1 | 11/2015 | Taniyama et al. |

* cited by examiner

FIG. 1 LFW-1 test geometry.

ANTIFRICTION COATING COMPOSITION

CROSS REFERENCE TO RELATED APPLICATIONS

This application is a U.S. national stage filing under 35 U.S.C. § 371 of PCT Application No. PCT/US21/047110 filed on Aug. 23, 2021, currently pending, which claims the benefit of U.S. patent application Ser. No. 63/069,446 filed Aug. 24, 2020 under 35 U.S.C. § 119 (e). PCT Application No. PCT/US21/047110, and U.S. patent application Ser. No. 63/069,446are hereby incorporated by reference.

FIELD OF THE INVENTION

The present invention relates, generally, to antifriction coating compositions, antifriction coatings formed from the compositions, and sliding members having the antifriction coatings.

BACKGROUND OF THE INVENTION

Antifriction coatings (AFCs) are known in the art to improve sliding properties of components used for industrial machines, construction machines and automobiles. Typical antifriction coating compositions comprise resin binders, solid lubricants and solvents. The solid lubricants work to reduce friction and wear of contacting surfaces in relative motion and provide protection from damage. Well-known solid lubricants include molybdenum disulfide ($MoS_2$), graphite and polytetrafluoroethylene (PTFE). The resin binders work to bind the solid lubricant and provide strength to the AFC. Two well-known resin binders include polyamide and polyamideimide.

WO2016/073341A discloses a connecting rod comprising a wear resistant coating. The wear resistant coating comprises a polymer matrix, solid lubricant and hard particles, wherein the solid lubricant is selected from molybdenum disulfide, graphite, tungsten sulfide, hexagonal boron nitride, polytetrafluoroethylene and metal sulfides. It can contain one or more solid lubricant. U.S. Pat. No. 7,368,182B discloses a further coating to improve wear resistance.

AFCs may be applied to components by various methods. For example, liquid coatings may be applied via dip coating, spin coating, brushing, and spray coating. These methods impose some inherent limitations on the liquid AFC composition and its performance as an AFC. For example, the base resin binder must have some solubility in the solvent. Because solubility decreases with increasing molecular weight of the resin binder with similar structure, a resin binder of sufficiently low molecular weight is required to maintain flowability and/or sprayability. However, lowering molecular weight can be accompanied by a similar reduction in the strength of the AFC. Similarly, increasing the content of resin binder and solid lubricant in the liquid AFC composition can negatively affect flow and sprayability of the liquid AFC composition but improve strength and sliding properties of the AFC, respectively.

Although some AFCs comprising resins and solid lubricants show excellent sliding properties, a need still exists for liquid AFC compositions providing AFCs having improved strength and/or sliding properties and applied using known methods such as spray coating.

BRIEF SUMMARY OF THE INVENTION

The present invention is directed to an antifriction coating composition comprising (a) a soluble resin, (b) an insoluble polymer, (c) optionally a solid lubricant, and (d) a solvent.

The present invention is further directed to an antifriction coating formed from the antifriction coating composition.

The antifriction coating composition may be applied to parts with traditional methods of applying a liquid AFC composition and the resulting AFC has improved properties such as a reduced coefficient of friction and increased durability.

DETAILED DESCRIPTION OF THE INVENTION

Figure 1:
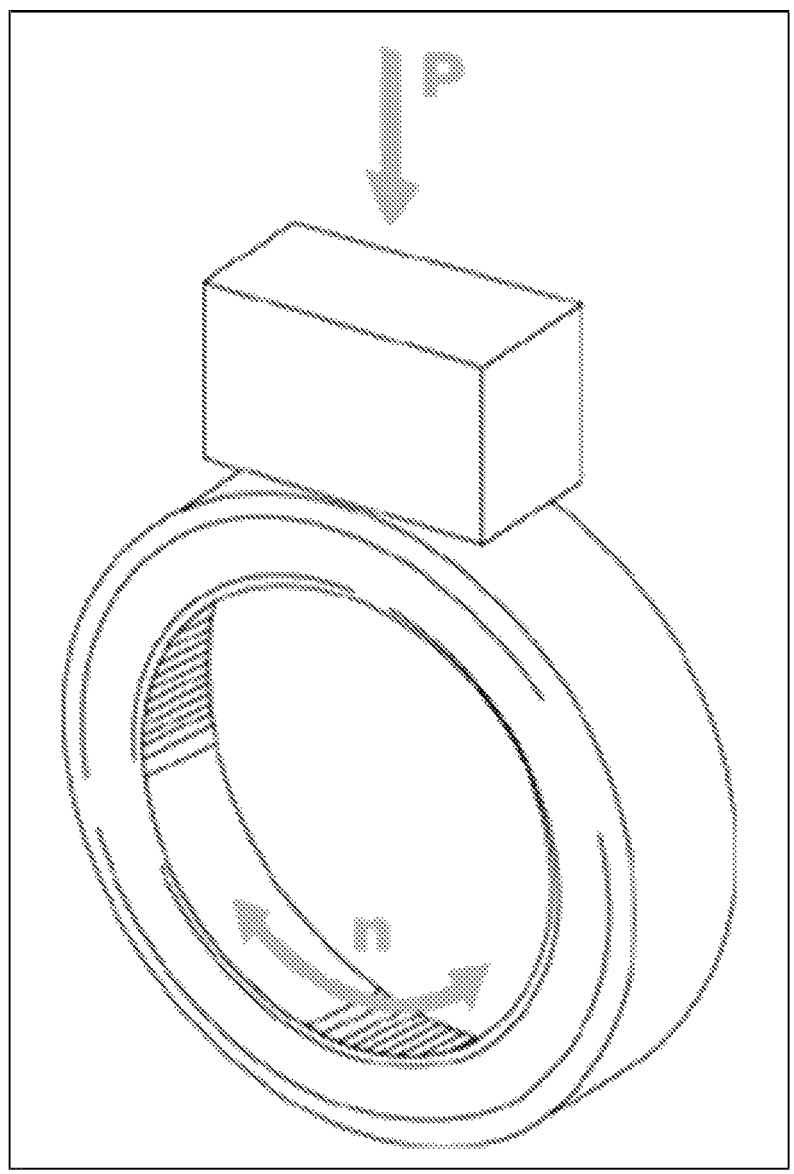
FIG. 1 shows the geometry of LFW-1 test.

The terms "comprises," "comprising," "includes," "including," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

An antifriction coating composition, comprising:
(a) a soluble resin,
(b) an insoluble polymer,
(c) optionally a solid lubricant, and
(d) a solvent.

The soluble resin (a) of the antifriction coating composition works as a matrix polymer of an antifriction coating described later. Examples of resin include polyamideimide, polyimide, polyamide, epoxy resin, phenol resin, polybenzimidazole, polyphenyl sulfonate, polyether ether ketone, polyurethane, poly-butyltitanate, polyacryl-alkyd resin, polyetherketoneketone (PEKK), polyoxymethylene (POM), polybutylene terephthalate (PBT), fluoropolymers, and mixtures thereof. In one embodiment the soluble resin (a) includes polyamideimide, (polyimide) and (polyamide), alternatively polyamideimide. In one embodiment, the soluble resin (a) is a polyamideimide, wherein the polyamideimide comprises amide and imide polymer units in a ratio of imide to amide polymer units from 60:40 to 86:14, alternatively 60:40 to 70:30.

The soluble resin is soluble in the solvent of the Liquid AFC composition at the concentrations described later. The molecular weight of the soluble resin affects solubility in the solvent. For example, some lower molecular weight polyimide resins may be soluble but higher molecular weight variants of the same monomers and monomer ratios may not be soluble. With respect to the soluble polymer, "soluble" means that the resin will dissolve in the solvent forming a homogeneous solution and includes resin materials of molecular weights that dissolve in the solvent to form a solution.

The soluble resin present in the antifriction coating formulation composition ranges from 10 to 90 parts by weight with respect to 100 parts by weight of the solid contents of the antifriction coating formulation composition. More preferably, the resin content is from 20 to 80 parts by weight, and even more preferably from 30 to 70 parts by weight, with respect to 100 parts by weight of the solid content of the antifriction coating formulation composition. In this specification, the weight of the solid contents of the antifriction coating formulation composition means the total weight of the solid contents of the AFC formulation composition (i.e., soluble resin, insoluble resin, solid lubricant and additional ingredients with solid form).

Methods for making the soluble polymer are known in the art. Many soluble polymer materials are available commercially.

The AFC comprises an insoluble polymer. The insoluble polymer is insoluble in the liquid AFC composition. "Insoluble" means that a material will not dissolve in the solvent of the liquid AFC composition to form a homogeneous liquid and thus must be dispersed in the AFC composition.

The insoluble polymer has a molecular weight sufficiently high so that the insoluble polymer is insoluble in the liquid AFC composition, alternatively a molecular weight (Mw) that is greater than 20,000 Daltons, alternatively greater than 50,000 Daltons, alternatively from 50,000 to greater than 70,000 Daltons, alternatively from 50,000 to 100,000 Daltons.

The insoluble polymer is a polyamideimide, a polyamide, or a polyimide polymer, alternatively a polyamideimide polymer wherein the ratio of amide to imide is from 0:100 to 90:10, alternatively 0:100 to 50:50, alternatively from 0:100 to 10:90, alternatively the insoluble polymer is a polyimide homopolymer comprising less than 1% (w/w), alternatively substantially no amide monomer units, alternatively, no amide monomer units.

The particle size of the insoluble polymer depends on the thickness desired of the AFC formed from the liquid AFC composition. The coating formed by the liquid AFC composition typically has a desired average thickness from 5 to 20, alternatively from 10 to 15, microns. One skilled in the art would know how to determine the average thickness of an AFC. For example, the coating thickness may be determined by measurement using profilometry or optical methods. The average particle size of the insoluble polymer is less than 15, alternatively from 0.1 to 10, alternatively 1 to 6, microns (i.e., micrometers). One skilled in the art would know how to measure the average particle size of the insoluble polymer. In one embodiment, the particle size of the insoluble polymer is determined by laser light scattering using a Malvern Particle Size Analyzer Mastersizer 3000.

One skilled in the art would know how to make the insoluble polymer. Methods of making polyamideimide and polyimide polymers are well known. For example, the polyimide is made by polymerizing the appropriate monomers, such as amines and anhydride compounds, to form the insoluble polyimide polymer or in combination with other appropriate monomers to also form the polyamide portion of an insoluble polyamideimide polymer. Many polymers useful as the insoluble polymer are available commercially.

The amount of the insoluble polymer in the liquid AFC composition ranges from 1 to 89 parts by weight, preferably from 5 to 50 parts by weight and more preferably from 10 to 30 parts by weight, with respect to 100 parts by weight of the solid resin content (i.e., the soluble resin and the insoluble polymer) of the antifriction coating formulation composition.

The solid lubricant (c) is a solid material that provides lubrication to the AFC made from the liquid AFC composition. Many solid lubricants for liquid AFC compositions are known in the art. The solid lubricants (c) used in the liquid AFC composition typically have a platelet-like structure, with these "sheets" sliding relatively easily against each other. The materials naturally cluster into larger agglomerates that are easily broken down into smaller particles during the preparation and mixing of the antifriction coatings. The average primary particle size of the solid lubricants is preferably from 0.1 to 10 micrometers, more preferably from 1 to 6 micrometers.

Examples of solid lubricants include, but are not limited to, graphite, polytetrafluoroethylene (PTFE), polyethylene (PE), metal molybdenum sulfide ($M_xMo_{(1-x)}S_2$), where M is cobalt, tungsten, tantalum or nickel, and mixtures thereof. In one embodiment, the solid lubricant (c) is graphite, alternatively cobaltmolybdenum sulfide as described above.

The amount of the solid lubricant in the liquid AFC composition ranges from 1 to 89 parts by weight, preferably from 5 to 50 parts by weight and more preferably from 10 to 30 parts by weight, with respect to 100 parts by weight of the total solid content of the antifriction coating formulation composition.

The solvent (d) dissolves or solubilizes the soluble resin but does not dissolve or solubilize the insoluble polymer. Therefore, the solvent selected depends upon the soluble resin and insoluble polymer in the liquid AFC composition. Usable solvents include, but are not limited to, ketones such as acetone, methyl ethyl ketone, methyl isobutyl ketone and cyclohexanone; esters such as methyl acetate and ethyl acetate; aromatic hydrocarbons such as toluene and xylene; alcohols such as ethanol, 2-propanol, diacetone alcohol (DAA); organic halogen compounds such as 1,1,1-trichloroethane, trichloroethylene and trichlorotrifluoroethane; N-methyl-2-pyrrolidone (NMP), N-ethyl-2-pyrrolidone (NEP), 1,3-dimethyl-2-imidazolidinone (DMI), 3-methoxy-N,N-dimethylpropanemide, methylisopyrrolidone (MIP), dimethylformaldehyde (DMF), dimethylacetaldehyde (DMAC), gamma-butyrolactone (GBL), and mixtures thereof. Preferred solvents are DMI, NEP and xylene.

The antifriction coating formulation composition described herein may optionally include additional ingredients such as a UV absorber, a stabilizer, an antioxidant, a leveling agent, a defoamer, a thickener, a pigment, a dye, or a dispersant as long as the object of the present invention is not impaired. When present, the amount of additional ingredients will preferably range from 0.1 to 5 parts by weight, with respect to 100 parts by weight of the solid content of the antifriction coating formulation composition.

The antifriction coating formulation compositions described herein may be prepared using methods known to those skilled in the art, for example, mixing the described ingredients using conventional apparatus in any suitable order. For example, dissolving resins and introducing the insoluble polymer and the solid lubricant and other ingredients if present. In one embodiment, the solid lubricant is added to the antifriction coating as a polymer/graphite composite. Additional solid lubricant and/or insoluble polymer may also be added separately from the polymer/graphite composite. Methods of forming polymer/graphite composites are known in the art. For example, a method of encapsulating graphite in polyimide is taught in U.S. Pat. No. 5,886,129, which is hereby incorporated by reference for its description of how to encapsulate graphite in polyimide.

A method of coating a part, the method comprising the step of applying a liquid antifriction coating composition to a part.

The antifriction coating is applied to the part using methods known in the art for applying a liquid AFC composition to a part. For example, the liquid AFC composition may be applied to a part by spray coating, dip coating, brushing, or spin coating, alternatively the liquid AFC composition is applied to the part by spray coating. One skilled in the art would know how to apply an liquid AFC composition to a part using spray coating, dip coating, or spin coating.

The liquid AFC composition in the method of coating a part is the liquid AFC composition described above. The part that the liquid AFC composition is applied to can be any part to which one skilled in the art would apply an antifriction coating composition. An example of a part would be a sliding member selected from a swash plate of a compressor, an engine tappet, a camshaft, a crankshaft, an engine metal, an engine piston, an engine fastener, a slide bearing, a piston ring, a gear, a door lock, a brake shim or a brake clip. In addition to metal, the part can be plastics, wood, elastomers, composites, etc. The part may also be referred to as a substrate.

In one embodiment, the method of coating a part further comprises additional steps known in the art with such methods. For example, the method may include the additional step of drying the liquid AFC composition to form the AFC. Drying may comprise, for example, air drying or heating the part. As used herein, "drying" means removing the solvent from the liquid AFC composition to form the solid AFC film. The heating may also perform the task of curing the liquid AFC composition to form the AFC.

A part coated with an AFC, wherein the part is coated by the method of coating a part describe above and the AFC is as described above.

A part coated with an AFC, wherein the coating has a thickness of 5 to 50 microns, alternatively a thickness of 10 to 15 microns, and wherein the method of coating a part describe above and the AFC is as described above.

A part coated with an AFC as described above using the method described above, where in the part is a sliding member. Examples of sliding members include, but are not limited to a swash plate of a compressor, an engine tappet, a camshaft, a crankshaft, an engine metal, an engine piston, a piston ring, a gear, a door lock, a brake shim or a brake clip.

A coated film formed from the above-mentioned antifriction coating composition. The film is formed by applying the composition described above onto the surface of a substrate and then heating it to cure the applied composition. The substrate can be metal, plastics, wood, elastomers, composites, etc. The coating can be applied to the surface by any conventional method, for example spin coating, brushing, dipping and spraying. The coating thickness is determined from the required properties and the life of the film, but it is typically from 5 to 20 micrometers, alternatively 10 to 15 micrometers. Once the antifriction coating formulation composition is applied on the surface of a substrate, it is dried to evaporate the solvent (if applicable) and is cured to form a coated film. The curing process depends on the nature of the substrate and the kind of resin. For example, the cure can be conducted in an oven for 30 to 90 minutes at a temperature of between 100 to 280° C. The meaning of the term "cure," as used herein, is broader than the narrow definition in the art of where there is a chemical reaction involved in the process and is also intended to encompass processes where there may be no, or very little, reaction taking place but involves a change in physical properties such as occurs with a thermoset material.

The liquid AFC compositions can be used to coat parts, for example parts used in automobiles as well as other industries, alternatively the parts are sliding members used in automobiles as well as other industries. The liquid AFC compositions form AFCs that help to prolong the life of engines, alternative parts, alternatively sliding members, and other parts where friction can lead to part failure.

EXAMPLES

The following examples are presented to better illustrate the method of the present invention, but they are not to be considered as limiting the invention, which is delineated in the appended claims. Unless otherwise noted, all parts and percentages reported in the examples are by weight. The following table describes the abbreviations used in the examples:

TABLE 2

List of abbreviations used in the examples.

| Abbreviation | Word |
|---|---|
| g | gram |
| Me | methyl |
| wt | weight |
| % | percent |
| mol | mole |
| hr | hour |
| ° C. | degrees Celsius |
| NA | Not Applicable |
| mL | milliliters |
| Solids Content | (wt. of dried sample/wt. of initial sample) × 100 and determined as described below |
| mm | millimeter |
| micron | micrometer |
| PI | Insoluble polymer; polyimide polymer |
| DMI | 1,3-Dimethyl-2-imidazolidinone |
| PAI | polyamideimide |

Background: Test Methods

Ball-on-Plate Wear Test

Figure 2:
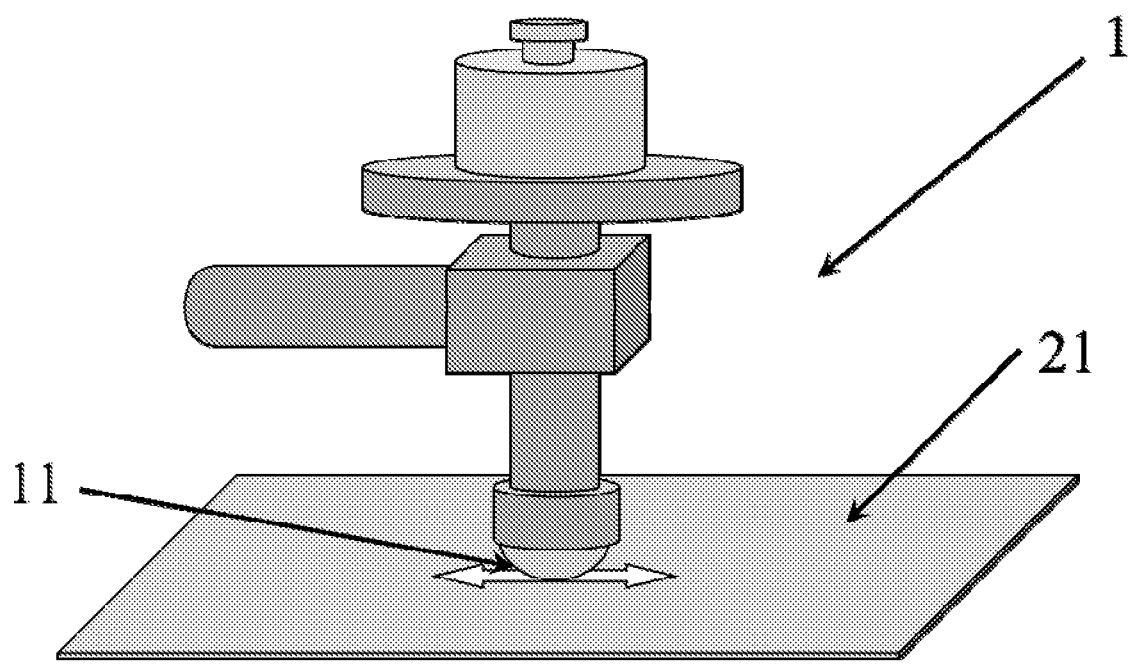
FIG. 2 shows the geometry of the test setup of the Ball-on-plate wear test.

Ball-on-plate wear tests were conducted following ASTM G-133. In reference to FIG. 2, a ½" diameter steel ball (11) was brought into contact with the anti-friction coating (21), which has been applied to a steel (or other material) coupon, with a force of 10N. The load was maintained throughout the test as the test sample was reciprocated back and forth with a stroke length of 4 mm for a total of 10,000 passes (or 5000 cycles). The geometry of the test setup (1) from ASTM G-133 is shown in FIG. 2 for reference.

After the test, wear scars are evaluated for depth, and the % wear is reported as an average depth of scar/depth of film. Average coefficient of friction is also reported, either for the entire 5000 cycle test or for a subset of that test (e.g., first 1000 or 2000 cycles).

Block on Ring Test

A second tribology test used is the LFW-1, or block on ring test (ASTM-D 2714). (See FIG. 1.) This is a dry test done under relatively high load (2,860N) at 72 rpm in which an upper block is brought into contact with a coated ring under the applied load, and the ring is rotated beneath the block such that the wear surface is the outer area of the ring (with a width of the upper block). This test steps up the load over the first 10 minutes and holds the maximum 2,860 N until the coating fails and coefficient of friction increases dramatically. The basic geometry for this test is shown in FIG. 1. Since LFW-1 is run to failure of the coating, the performance is reported by the number of cycles under max load until failure (i.e., marked by a dramatic increase of CoF).

Materials used in the Examples

Hitachi HPC-9300D: Commercial polyamideimide resin (PAI Resin) purchased from Hitachi Chemical Company Ltd. Supplied with 20% non-volatile content in DMI (1,3,-dimethyl-2-imidazolidinone) solvent.

Hitachi HPC-5000E-37: Commercial polyamideimide resin. Supplied with 36% non-volatile content in NEP (N-ethyl-2-pyrrolidone) solvent.

SCP5000 resin: Polyimide resin (insoluble polymer); supplied by DuPont from Vespel®, tensile PSI 24230, elongation 7%.

Graphite CSSP: Graphite purchased from Nippon Graphite Industries with average particle size of around 1 micron.

Graphite UF-2: Graphite purchased from AMG Graphite, average particle size 1.8 microns.

$MoS_2$: Purchased from Climax Molybdenum. The Tech Fine grade had a median particle size of 6 microns. The Tech grade had a median particle size of about 30 microns.

Cefral Lube: Tetrafluoroethylene oligomer purchased from Central Glass Co., Ltd. The molecular weight was from 1,500 to 20,000 Daltons.

Standard Antifriction Coating Composition and AFC.

Example 1—Method of Making Liquid AFC Compositions, and AFC from Liquid AFC Composition The antifriction coating compositions (Examples 2 and 4) in the table below were prepared by adding the solid lubricant and insoluble polymer components to a solution of the soluble polymer resin. This mixture was then milled in a Gyromixer for 10-20 minutes with approximately 2 mm steel media and filtered to remove the media. The final formulation was then diluted to a suitable viscosity, and a film was sprayed onto the test part. After spraying the film, the part was heated in at 80° C. for 10 minutes, then at 180-230° C. for one hour for a target film thickness of around 15 microns.

Examples 2-5

Two liquid AFC compositions (Example 2 and Example 4) and the composition of dried films formed from the liquid AFC compositions are shown in the following table. Amounts of individual materials were varied as described in the specific Examples. The soluble resin and insoluble polymer were added by weight percent such that the total amount (i.e., the sum) of insoluble resin and soluble polymer in the dried film remained the same, and the pigment (i.e., solid lubricant) to binder (soluble resin and insoluble polymer) ratio remained the same so that samples could be directly compared for performance properties.

| Material Function | Material Description | Example 2 Wt. % | Example 3 Wt. % | Example 4 Wt % | Example 5 Wt % |
|---|---|---|---|---|---|
| Binder - Soluble resin | Commercial PAI resin: Hitachi HPC-9300D and | 48.10 | 20.66 | | |
| Binder - Soluble resin | HPC-5000E-37 | | | 68.50 | 26.55 |
| Binder - PI Resin/ insoluble polymer | Vespel ® SCP5000 | 4.12 | 8.85 | 1.37 | 2.95 |
| Solid lubricant | Graphite CSSP | 6.28 | 13.49 | 6.28 | 13.49 |
| Solid lubricant | $MoS_2$ Tech Grade or Tech Fine grade | 18.73 | 40.23 | 18.73 | 40.23 |
| Solid lubricant | Cefral Lube PTFE | 7.81 | 16.77 | 7.81 | 16.77 |
| Solvent | DMI | 14.96 | 0 | 4.01 | 0 |
| Total | | 100 | 100 | 100 | 100 |

Example 2 and 4 represent liquid AFC compositions, and Examples 3 and 5 represent the solid weight percentage of each material in the films formed from the liquid AFC compositions of Examples 1 and 3, respectively.

Comparative Examples 1-2

| Material Function | Material Description | Comparative Example 1 Wt. % | Comparative Example 2 Wt. % |
|---|---|---|---|
| Binder - Soluble resin | Commercial PAI resin: Rhodeftal 210 | 59.07 | 51.06 |
| Solid Lubricant | Graphite UF-2 Technical Fine | 5.26 | 1.65 |
| Solid Lubricant | $MoS_2$ Tech Grade | 16.10 | 16.45 |
| Solid Lubricant | CEFRAL LUBE | 6.71 | 13.49 |
| Solvent | DMI | 12.86 | 0 |
| Total | | 100 | 100 |

Example 6—Performance of Dry AFC Compositions

Figure 3:
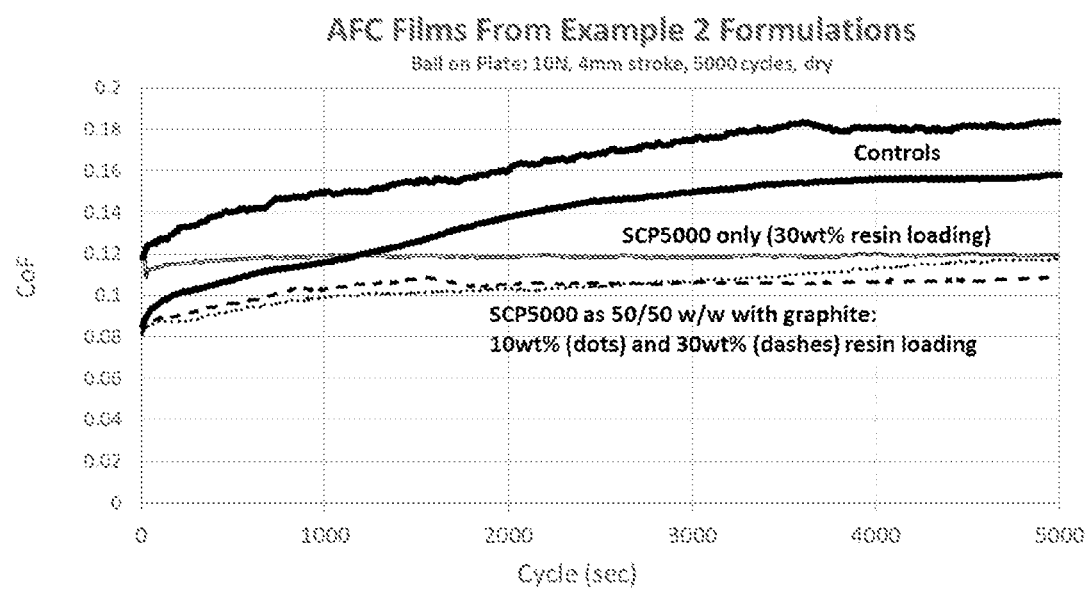
FIG. 3 is a plot of coefficient of friction for the various coatings as a function of test time for a standard ball-on-plate wear test for formulation variations of Example 2 and control formulations.

Films formed from liquid antifriction coating compositions comprising the soluble polymer and insoluble polymer with and without graphite (solid lubricant) and keeping the sum of soluble resin and insoluble polymer the same were tested for coefficient of friction with control formulations (i.e., containing no insoluble polymer). In the plot in FIG. 3, coefficient of friction is shown for the various coatings as a function of test time for a standard ball-on-plate wear test (described above) for formulation variations of Example 2. The variations are noted in the graph and table. Comparative Examples (labeled "Controls" and graphed with solid black lines) having no insoluble polymer (i.e., 100% soluble polymer as binder) were included in the testing. The formulations plotted with the gray line are with a high loading of polyimide solids (i.e., 30% (w/w) of total binder in the dry film) and give improved coefficient of friction over the course of the test and shows the desired plateau. The samples represented by dots and dashed lines are even further improved for coefficient of friction and were prepared by adding the polyimide as part of a mixed polyimide-graphite composition while keeping overall graphite dosage constant. That is, any additional graphite combined separately from the mixed polyimide-graphite composition was reduced by the amount of graphite added together with the polyimide so as to keep a consistent pigment:binder ratio. The examples demonstrate that adding the insoluble polymer reduces the coefficient of friction.

The coefficient of friction (CoF) was measured at various stages in the ball-on-plate wear test. The table below shows the same samples in the plot above based on the Example 2 formulation and comparing the CoF values at test start, 1000, 2000, and 5000 cycles (test end).

|  | Coefficient of Friction (Ball on plate test) | | | |
| --- | --- | --- | --- | --- |
|  | Initial | 1000 Cycles | 2000 Cycles | 5000 Cycles |
| Control 1 | 0.119 | 0.149 | 0.16 | 0.184 |
| Control 2 | 0.086 | 0.116 | 0.138 | 0.158 |
| 30% (w/w) PI (SCP5000) | 0.123 | 0.119 | 0.119 | 0.12 |
| 10% (w/w) PI (as 50/50% (w/w) PI/graphite) | 0.081 | 0.103 | 0.105 | 0.108 |
| 30% (w/w) PI/graphite | 0.082 | 0.099 | 0.103 | 0.118 |

The results show that the samples with the insoluble PI polymer maintained a lower CoF after 5000 cycles. Samples with the insoluble PI polymer/graphite added had lower CoF at all points during the test.

Compositions were evaluated in the ball-on-plate test, where the test was continued until film failure or until the coefficient of friction increased rapidly, which is typically when the film has worn through and exposed bare substrate. In this test, samples with 10 wt % and 30 wt % added insoluble PI polymer (SCP5000) as solids in the formulations lasted significantly longer than the control. The test was run under the same load and speed conditions as described above, and failure is noted as the point at which CoF increases to values higher than 0.5. The results are in the table below. The results show the increased time to failure of the combination of the insoluble polymer (PI polymer) and graphite. The samples were the same as the control except the test samples had insoluble PI polymer added. In the last two test samples, the insoluble PI polymer was added to the formulation as a PI polymer/graphite blend. The ball-on-plate test parameters were a 10 newton (N) load, ½ inch ball, a 4 mm stroke, 2 Hz, and no lubrication.

Examples 7-8

A second antifriction coating formulation based on Example 4 and Example 5 formulations) was prepared with insoluble PI polymer and PI/graphite or PI/MoS$_2$ solids and compared to Comparative Example 2 above in the block on ring test (described above). As can be seen in the table below, the number of cycles that samples with the additional solids lasted were almost all significantly better than the control. Particularly the formulations with PI/graphite and PI/MoS$_2$ solids gave the most dramatic increase in cycles.

| Sample Description | Number of Cycles to Failure |
| --- | --- |
| Comparative Example 2 | 65764 |
| Comparative Example 2 | 88053 |
| Comparative Example 2 (CE2) with 10% (w/w) SCP5000 | 69726 |
| CE2 with 10% (w/w) SCP5000, 260° C. | 81750 |
| CE2 with 30% (w/w) SCP5000 | 110742 |
| CE2 with 30% (w/w) SCP5000, 260° C. | 261436 |
| CE2 with 10% (w/w) SCP5050 | 54387 |
| CE2 with 10% (w/w) SCP5000 (as 73% (w/w) Tech Fine MoS$_2$) | 260285 |
| CE2 with 30% (w/w) SCP5000 (as 73% (w/w) Tech Fine MoS$_2$) | 271287 |
| CE2 with 10% (w/w) SCP5000 (as 50% (w/w) 2 micron graphite) | 224089 |
| Graphite Comparative Example | 214485 |
| Graphite Comparative Example | 254425 |

That which is claimed is:

1. A part, comprising an antifriction coating on the part, in which the antifriction coating is formed from an antifriction sorting coating formulation composition, comprising:
   (a) a soluble resin,
   (b) an insoluble polymer,
   (c) optionally a solid lubricant, and
   (d) solvent,
   wherein the part is a sliding member selected from a swash plate of a compressor, an engine tappet, a camshaft, a crankshaft, an engine metal, an engine piston, a piston ring, a gear, a door lock, a brake shim or a brake clip.

2. The part according to claim 1, wherein the insoluble polymer is a polyamideimide, a polyamide, or a polyimide polymer.

3. The part according to claim 2, wherein the insoluble polymer is a polyimide polymer.

4. The part according to claim 1, wherein the antifriction coating formulation composition comprises the solid lubricant and the solid lubricant comprises one of more of graphite, polytetrafluoroethylene, polyethylene, or a metal sulfide comprising molybdenum and cobalt.

5. The part according to claim 1, wherein the soluble resin is selected from polyamideimide, polyimide, polyamide, epoxy resin, phenol resin, polybenzimidazole, polyphenyl sulfonate, polyether ether ketone, polyurethane, polybutyltitanate, polyacryl-alkyd resin, polyether ketone ketone, polyoxymethylene, poly butylene terephthalate, or fluoropolymers.

6. The part according to claim 1, wherein the soluble resin is polyamideimide, wherein the polyamideimide comprises amide and imide polymer units in a ratio of imide to amide polymer units from 60:40 to 86:14.

7. The part according to claim 1, wherein the antifriction coating formulation composition comprises from 10 to 30% (w/w), based on the weight of the soluble resin and insoluble polymer in the antifriction coating formulation composition, of the soluble resin, and 5 to 90% (w/w), based on the weight of soluble resin and insoluble polymer in the antifriction coating formulation, of the insoluble resin.

8. The part according to claim 1, wherein the coating has a thickness of 5 to 50 microns.

* * * * *